May 8, 1962  F. N. BARD  3,033,595
BALL JOINT
Filed June 15, 1959

Inventor
Francis N. Bard
Hofgren, Brady, Wegner,
Allen & Stellman
Attorneys

United States Patent Office 3,033,595
Patented May 8, 1962

3,033,595
BALL JOINT
Francis N. Bard, % Barco Manufacturing Co.,
500 N. Hough St., Barrington, Ill.
Filed June 15, 1959, Ser. No. 820,491
2 Claims. (Cl. 285—137)

This invention relates to ball joints.

A principal feature of the invention is the provision of a new and improved ball joint which is light in weight, compact, readily adjustable and operable over a wide range of temperatures and pressure.

Another feature of the invention is the provision of such a ball joint provided with a first member having a ball, an annular second member having a spherical inner surface confronting and spaced from the ball, an annular third joint member having a complementary spherical portion spaced between said surface and said ball, an annular liner of antifriction bearing material between said surface and the spherical portion of the third member, and an annular seal sealingly secured to the third member and movably sealingly engaging the ball.

A further feature of the invention is the provision of such a ball joint including means adjustably securing the second member to the first member for providing adjustable positioning of the third member axially of the ball.

Figure 1:
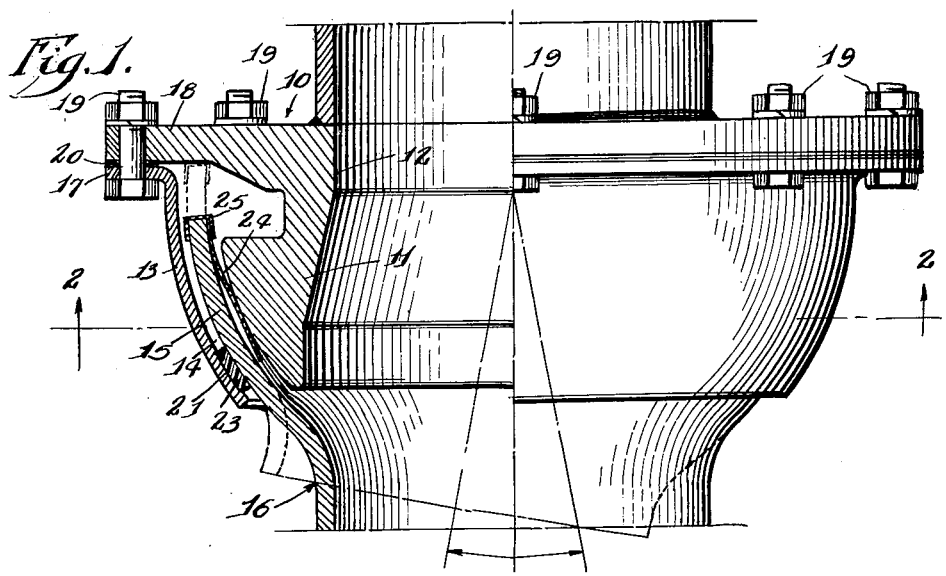
Figure 2:
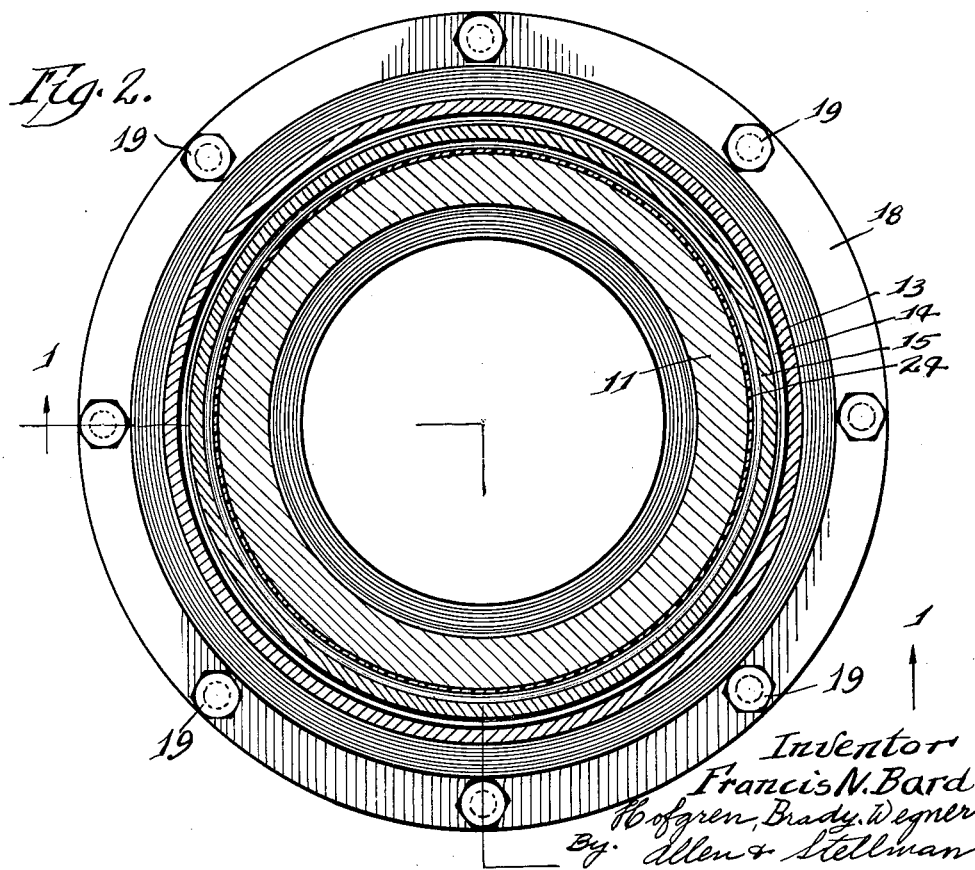

Other features and advantages of the invention will be apparent from the following description taken in connection with the accompanying drawing wherein:

FIG. 1 is a side view of a joint embodying the invention, the left half of the view being in diametric section and the right half of the view being in elevation; and FIG. 2 is a transverse section taken substantially along the line 2—2 of FIG. 1.

In the embodiment of the invention disclosed in the drawing, a flexible ball joint comprises a first joint member 10 including a ball 11 having a bore 12 therethrough. Secured to first member 10 is an annular second member 13 having an inner spherical surface 14 confronting and spaced from ball 11. Movably received in the space between surface 14 and ball 11 is spherical portion 15 of a third joint member 16.

Second joint member 13 is provided with a radial flange 17 removably, adjustably secured to a radial flange 18 on first member 10 by suitable means such as bolts 19 and spacers 20. A shallow annular recess 21 is provided in the inner surface 14 of joint member 13 to retain an annular liner 23 of non-galling antifriction bearing material (as Kel-F, trifluoroethylene polymer, for example) supporting the spherical portion 15 of third joint member 16.

An annular seal 24 is secured to the inner end of spherical portion 15 of the third joint member by suitable means such as clip 25 and extends frusto-conically into movable sealing engagement with the outer surface of ball 11. Seal 24 is formed of a material having a high coefficient of expansion (as Teflon, tetrafluoroethylene polymer, for example). Joint members 10 and 16 may be formed of metal or other similar material having a relatively lower coefficient of expansion, whereby the sealing engagement of seal 24 with the ball is maintained down to extremely low temperatures as well as at relatively high temperatures.

In assembling the joint, spherical portion 15 of the third joint member with seal 24 installed thereon is moved over the ball 11 to approximately the position of FIG. 1. Second joint member 13 is then moved over the third joint member and secured to flange 18 by means of bolts 19. The axial relationship of the spherical portion 15 with the ball 11 is adjusted by means of spacers 20 to provide the proper sealing tension in seal 24 by adjusting the amount that it is stretched over the ball.

While I have shown and described certain features of my invention, it is to be understood that it is capable of many modifications. Changes, therefore, in the construction and arrangement may be made without departing from the spirit and scope of the invention as defined in the appended claims.

I claim:

1. A ball joint particularly adapted for use at extreme temperatures comprising: a first member having a ball; an annular second member having a spherical inner surface confronting and spaced from the ball; an annular third member having a spherical portion spaced between said surface and the ball; an annular liner of antifriction bearing material between the spherical portion of the third member and said surface; and an annular seal having a coefficient of expansion greater than that of the ball for sealing the ball to the third member, said seal being generally frusto-conical in shape and having one terminal edge portion sealingly secured to the third member, having another portion axially spaced from said terminal edge portion sealingly engaging the ball and with an intermediate portion spaced from the third member to permit radial movement of said other portion with changes in temperature of the ball without affecting the seal of said terminal edge portion to said third member.

2. A ball joint particularly adapted for use at extreme temperature comprising: a first member having a ball; an annular second member having a spherical inner surface confronting and spaced from the ball; an annular third member having a spherical portion adjustably spaced between said surface and the ball; an annular liner of antifriction bearing material being retained against axial displacement relative to said surface and disposed between the spherical portion of the third member and said surface; and an annular seal of material having a coefficient of expansion greater than that of the ball for sealing the ball to the third member, said seal being generally frusto-conical in shape and having one terminal edge portion sealingly secured to the third member, having another portion axially spaced from said terminal edge portion sealingly engaging the ball and with an intermediate portion spaced from the third member to permit radial movement of said other portion with changes in temperature of the ball without affecting the seal of said terminal edge portion to said third member.

References Cited in the file of this patent

UNITED STATES PATENTS

| | | |
|---|---|---|
| 586,176 | Gorter | July 13, 1897 |
| 1,714,563 | Kiel | May 28, 1929 |
| 2,846,242 | Drake | Aug. 5, 1958 |

FOREIGN PATENTS

| | | |
|---|---|---|
| 204,481 | Great Britain | Oct. 4, 1923 |